UNITED STATES PATENT OFFICE.

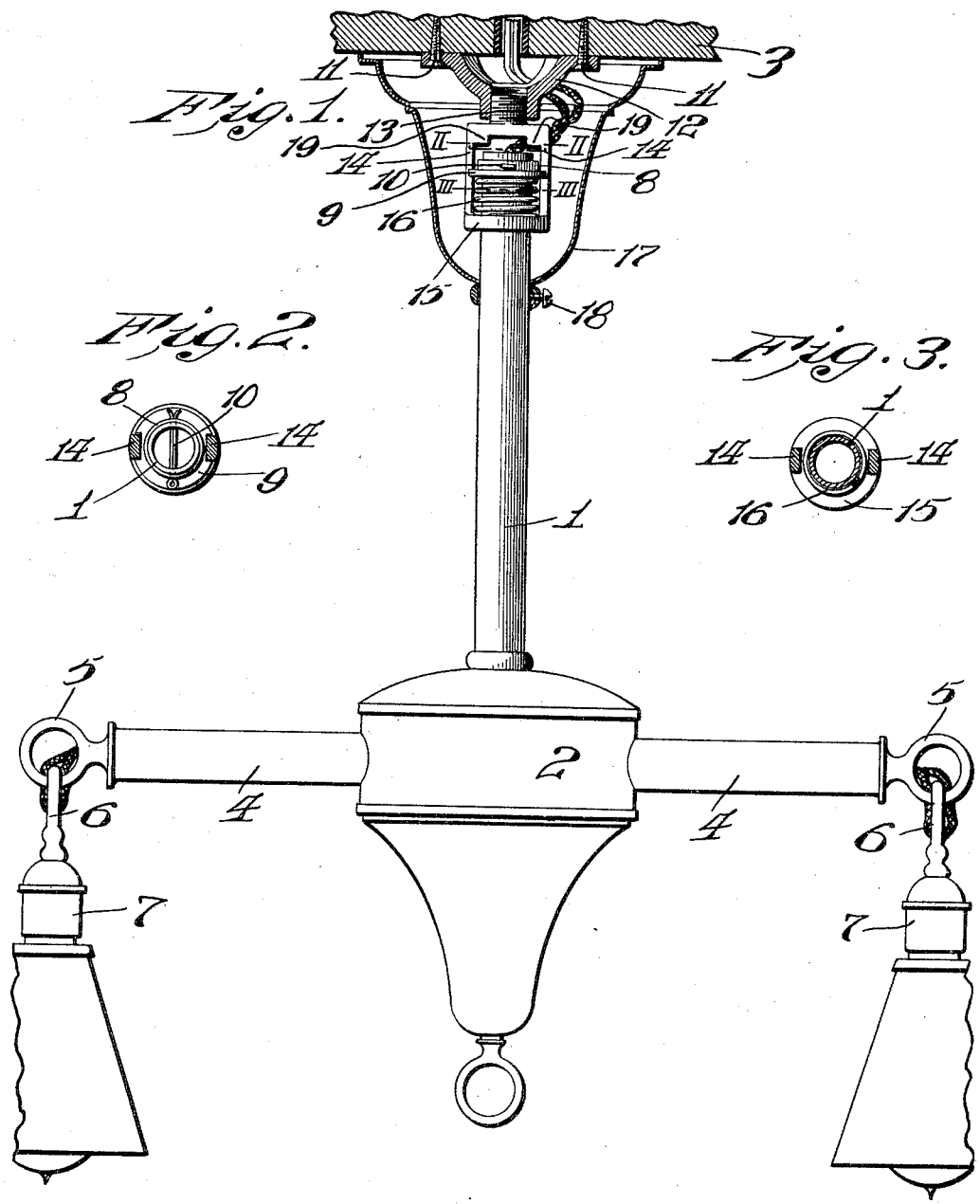

HENRY C. KRAUSHAAR, OF ST. LOUIS, MISSOURI.

SHOCK-ABSORBER FOR CHANDELIERS.

1,006,232.  Specification of Letters Patent.  Patented Oct. 17, 1911.

Application filed February 1, 1911. Serial No. 605,909.

*To all whom it may concern:*

Be it known that I, HENRY C. KRAUSHAAR, a citizen of the United States, residing at St. Louis, in the State of Missouri, have invented certain new and useful Improvements in Shock-Absorbers for Chandeliers, of which the following is a specification.

This invention relates to shock absorbers for chandeliers, and has for its primary object to provide an improved construction, combination and arrangement of parts in devices of this character whereby any jars to the ceiling or walls of a room within which the chandelier may be suspended, are taken up without transmitting any injurious vibration to the lamp sockets, injury to delicate lamps within said sockets being thereby prevented.

More specifically, the main object of the present invention is to provide an improved suspension device for chandeliers which will protect them from injury.

Other and further objects will appear in the specification and be specifically pointed out in the appended claims, reference being had to the accompanying drawings exemplifying the invention and in which, Figure 1 is a side elevation of a chandelier provided with my improved device, parts being shown in section. Fig. 2 is a section on the line II—II, Fig. 1. Fig. 3 is a section on the line III—III, Fig. 1.

Referring more particularly to the drawings, the embodiment shown therein exemplifies the invention in its application to an electrolier, comprising a stem 1 by means of which the electrolier head 2 is suspended from a ceiling 3. Projecting radially from the head 2 are a plurality of bracket arms 4 provided on their outer extremities with suspension rings 5 with which are linked other rings 6 surmounting loop sockets 7 for holding incandescent lamp bulbs. The specific construction of these parts is not concerned in the present invention. As shown in the present embodiment, however, the stem 1 is represented as round, being provided adjacent its upper end with a collar 8 whose flange 9 is provided with a pair of oppositely disposed rectangular recesses, as shown in Fig. 2, for a purpose to be presently described. Said collar 8 is secured to the stem 1 and held against rotation relatively thereto by means of a split cotter pin 10 which passes through alined perforations in the upper part of the stem 1 and the collar 8. Secured to the ceiling 3 by means of screws 11, is a depending support or screw socket 12 with which the threaded tongue 13 of a suspension yoke, now to be described, is connected. Said suspension yoke comprises in an integral piece, a pair of forked arms 14 integrally connected below by a circular washer or collar 15 which slidably engages the stem 1. Interposed between the washer or collar 15 and the flange 9 of the collar 8, is a resilient member in the form of a coiled spring 16. It will be seen, therefore, that any jars imparted to the ceiling 3, are absorbed by the spring 16, the stem 1 being resiliently supported thereby. The usual shell or housing 17 is slidably mounted upon the stem 1 and secured by means of a set screw 18 to the stem to cover the parts of the shock absorber and suspension device from view.

In order to provide means for preventing injury to or cutting of the electric wires which extend down through the stem 1, the yoke 14 is provided within the upper inside corners thereof, with a pair of oppositely disposed lugs or stops 19 which are adapted to receive the impact of the upper end of the stem 1 in the event of the spring 16 being strong enough to cause the stem 1 to rebound with sufficient force to shear the wires between the upper cross member of the yoke 14 and said stem.

Obvious modifications can be made in the detail construction of the parts without departing from the spirit of my invention.

What I claim is:

1. In a device of the character described, the combination with the stem of a chandelier, said stem being provided with a flange adjacent its upper end, of a yoke comprising forked arms slidably engaging opposite edges of said flange and a ring integral with said arms and slidably engaging said stem below the flange, and cushioning means interposed between said ring and said flange.

2. In a device of the character described, the combination with the stem of a chandelier, of a flanged collar secured to the upper end of said stem, the flange of said collar being provided with guideways, a yoke provided with forked arms slidably engaging said guideways, a ring slidably engaging said stem, said ring being integrally connected below the said arms, and a spring interposed between said ring and said flange on the collar.

3. In a device of the character described, the combination with a fixed supporting socket, of a yoke provided with a threaded tongue fitting said socket and comprising a pair of oppositely disposed forked arms and a bearing ring integrally connecting the lower ends of said arms, a chandelier stem reciprocably mounted within said bearing ring, a flanged collar secured to the upper end of said stem, said collar being provided with oppositely disposed notches adapting it to slidably engage the arms of said fork, and resilient means interposed between said bearing ring and said flanged collar.

4. In a device of the character described, the combination with a fixed supporting socket, of a yoke provided with a threaded tongue fitting said socket and comprising a pair of oppositely disposed forked arms and a bearing ring integrally connecting the lower ends of said arms, a chandelier stem reciprocably mounted within said bearing ring, a flanged collar secured to the upper end of said stem, said collar being provided with oppositely disposed notches adapting it to slidably engage the arms of said fork, and resilient means interposed between said bearing ring and said flanged collar, the upper ends of said forked arms being provided with inwardly projecting lugs against which the upper end of the stem is adapted to abut, said lugs providing a space for electric wires when the upper end of the stem is in abutment with said lugs.

5. In a device of the character described, the combination with the stem of a chandelier, said stem being provided with an enlargement adjacent its upper end, of a yoke comprising forked arms slidably engaging said enlargement and a ring integral with said arms and slidably engaging said stem below said enlargement, cushioning means interposed between said ring and said enlargement, and means for suspending said yoke from a ceiling.

HENRY C. KRAUSHAAR.

In the presence of—
J. B. MEGOWN,
M. C. HAMMON.

Copies of this patent may be obtained for five cents each, by addressing the "Commissioner of Patents, Washington, D. C."